United States Patent Office 3,423,437
Patented Jan. 21, 1969

3,423,437
PROCESS FOR THE MANUFACTURE OF 17α,21-DIHYDROXY-20-KETOSTEROIDS
Georg Anner, Basel, Helmut Ueberwasser, Riehen, and Charles Meystre, Reinach, Basel-Land, Switzerland, assignors to Ciba Corporation, New York, N.Y., a corporation of Delaware
No Drawing. Filed May 27, 1966, Ser. No. 553,298
Claims priority, application Switzerland, July 9, 1965, 9,633/65; Apr. 6, 1966, 5,133/66
U.S. Cl. 260—397.45          5 Claims
Int. Cl. C07c 169/34; C07c 171/06

ABSTRACT OF THE DISCLOSURE

Process for the manufacture of 17α,21-dihydroxy-20-ketosteroids which comprises treating a steroid containing the 17α,20; 20,21-bismethylenedioxy grouping with a solution obtained by mixing anhydrous hydrogen fluoride with urea or a mono-, di- or tri-N-lower alkyl substituted derivative thereof.

---

The present invention provides a new process for the manufacture of 17α,21-dihydroxy-20-ketosteroids starting from corresponding 17α,20; 20,21-bismethylenedioxysteroids.

It is known that in 17α,21-dihydroxy-20-ketosteroids this very reactive grouping must be protected when it is desired to perform on other parts of the steroid skeleton reactions that could change also the 17α,21-dihydroxy-20-keto grouping. This is done nowadays with formaldehyde, whereby 17α,21; 20,21-bismethylenedioxy compounds are formed. This protective group can in many cases be split again with aqueous formic acid, but the yields thus obtained differ considerably. Thus, for example, it can be reconverted into the 17α,21-dihydroxy-20-keto grouping, often with good yields, in pregnane compounds that are unsubstituted in position 11 or substituted by an 11β-hydroxyl group. On the other hand, in the case of pregnane compounds that contain in position 11 an oxo group or a fluorine atom in position 9 the yields are relatively poor. In the case of 3,6,11-trioxo-A-nor-B-homopregnanes it can in these conditions no longer be split at all without destroying the basic skeleton. Moreover, with this manner of splitting of the protective group these are always formed also 21-formates which can be basically hydrolyzed only under specially chosen conditions without rearrangement to the D-homo compound. All these findings resulted in a restricted use of the 17α,20; 20,21-bismethylenedioxy grouping which otherwise is an ideal protective group.

The present invention provides a new method which enables the 17α,20; 20,21-bismethylenedioxy grouping to be split in a very simple manner and in general with a very high yield. According to the present process a steroid containing a 17,20; 20,21-bismethylenedioxy grouping is treated with a solution obtained by mixing anhydrous hydrogen fluoride with a carbamic acid or thiocarbamic acid or an amide or ester thereof.

The said carbamic or thiocarbamic acid compounds are, for example, the free carbamic acids or thiocarbamic acids or their esters as well as their N-alkylated derivatives, more especially N-dimethyl-, N-diethyl-, N-monomethyl-, N-monoethyl-carbamic or -thiocarbamic acid. As esters of these compounds there are preferably used: Lower alkyl esters, for example methylurethane, ethylurethane, isopropylurethane or the like. It is advantageous to use amides of the said carbamic or thiocarbamic acids, in the first place urea and thiourea. Furthermore, there may be mentioned: Mono-, di-, tri- and tetra-lower alkyl-ureas, for example tetramethylurea, symmetrical dimethylurea, asymmetrical dimethylurea or the corresponding thioureas, and the like.

When the afore-mentioned carbonic acid derivatives are mixed with anhydrous hydrogen fluoride, preferably liquid hydrogen fluoride, colourless, only very little fuming, storable liquids are formed. The said substances are most advantageously mixed at or above room temperature, preferably at +20 to +70° C., and the ratio between the amounts of carbonic acid derivative and hydrogen fluoride is preferably as a rule within the range from about 0.65 to 1.7.

The present invention enables the use of temperatures lower than those used in known processes. Thus, the protective group can be split advantageously at room temperature and a very good yield is obtained. Moreover, this reagent causes the splitting of a further ketal grouping present in the steroid molecule, for example in position 3, to the corresponding oxo group. It is also possible to convert a possibly present epoxide, for example in position 5, 6 or 9, 11, simultaneously into the vicinal fluoro-hydroxysteroid.

Accordingly, the present invention provides a new process for the manufacture of possibly fluorinated 17α,21-dihydroxy-20-ketosteroids by reaction, preferably within the temperature range from 0° to 30° C., in the first place at room temperature, of a 17α,20; 20,21-bismethylenedioxysteroid, which may further contain epoxide or ketal groupings, with a solution obtained by mixing anhydrous hydrogen fluoride with a carbamic or thiocarbamic acid or an amide or ester thereof, in the first place urea or thiourea, if desired in the presence of a solvent, whereby the bismethylenedioxy group and any possibly present ketal groupings and at the same time possibly present epoxide groups are split to form vicinal fluorohydroxyl groups. As solvents there may be used e.g. tetrahydrofuran or preferably dimethylsulfoxide.

As starting material there may be used any desired steroid that contains a 17α,20; 20,21-bismethylenedioxy grouping; it may contain further substituents, such as halogen, for example fluorine or bromine atoms, free or ketalized oxo groups or epoxide groups and/or it may contain double bonds.

The following examples illustrate the process of the present invention.

EXAMPLE 1

1.0 gram of 3-oxo-9,11β-epoxy-17α,20; 20,21-bismethylenedioxy-Δ⁴-pregnene is added with stirring and initial cooling to 7.5 ml. of a solution of 1 part of urea in 1.3 parts of hydrogen fluoride and 1.15 parts of tetrahydrofuran in a polyethylene vessel. The mixture is then kept at room temperature. In the course of one hour the reaction mixture turns into a homogeneous solution. After 3 hours it is poured over ice and the sodium carbonate solution is diluted and extracted with chloroform; the chloroform extract is dried and evaporated, and the residue is caused to crystallize by adding methylenechloride and ether, to yield 550 mg. of 9α-fluoro-hydrocortisone which melts at 258 to 261° C. after recrystallization from alcohol.

The identical result is obtained by using a solution of 1 part of urea in 0.8 part of hydrogen fluoride and 1.15 parts of tetrahydrofuran.

EXAMPLE 2

When 500 mg. of 3,11-dioxo-17α,20; 20,21-bismethylenedioxy-Δ⁴-pregnene are reacted as described in Example 1 with a solution of 1 part of urea in 1.3 parts of hydrogen fluoride and 1.15 parts of tetrahydrofuran, and the batch is stirred for 3 hours at room temperature, there are obtained 400 mg. of 3,11,20-trioxo-17α,21-dihydroxy-Δ⁴-pregnene melting at 210 to 213° C. After recrystallization from a mixture of methylenechloride and methanol it melts at 213 to 215° C.

EXAMPLE 3

As described in Example 1, 500 mg. of 3,11-dioxo-17α,20; 20,21-bismethylenedioxy-Δ⁴-pregnene are stirred with a mixture of 1 part of urea and 1.3 parts of hydrogen fluoride for 5 hours at room temperature, and the whole is then worked up as described in Example 1, to yield 370 mg. of 3,11,20 - trioxo - 17α,21 - dihydroxy-Δ⁴-pregnene which melts at 213 to 215° C. after recrystallization from a mixture of methylenechloride and methanol.

EXAMPLE 4

In a closable polyethylene bottle of 20 ml. capacity a mixture is prepared from 3 ml. of tetrahydrofuran and 6 ml. of the urea-hydrogen fluoride reagent described in Example 1, and then cooled to room temperature. There are then added 300 mg. of 3,6,11-trioxo-17α,20; 20,21-bis-methylenedioxy-A-nor-B-homo-Δ¹-pregnene, and the suspension is stirred for 2 hours at 20 to 25° C. with the aid of a magnet stirrer wrapped in Teflon, whereupon the crystals gradually dissolve. The clear solution is cautiously stirred into a mixture of 20 ml. of concentrated ammonia and about 80 g. of ice. The suspension obtained in this manner is repeatedly extracted with a 1:3-mixture of methylenechloride and ether. The combined organic extracts are washed with water, dried and evaporated under vacuum. The residue (440 mg.) is dissolved in a small amount of isopropanol, and the solution is filtered through a small amount of animal carbon and evaporated under vacuum. On addition of a small amount of isopropyl ether there are obtained 255 mg. of crystalline 3,6,11,20-tetraoxo-17α,21-dihydroxy-A-nor-B-homo-Δ¹-pregnene melting at 190 to 202° C. with decomposition. The infrared spectrum contains bands inter alia at 2.95, 5.90, 6.0 and 6.20μ. The mother liquors yield on concentration another 135 mg. of the identical compound melting at 186 to 202° C. with decomposition.

EXAMPLE 5

500 milligrams of 3,6-diketo-11β-hydroxy-17α,20; 20,21-bismethylenedioxy-A-nor-B-homo-Δ¹-pregnene are reacted and worked up as described in Example 1. The residue from the methylenechloride+ether extracts amounts to 445 mg.; it is dissolved in a small amount of ethyl acetate and the warm solution is filtered through a small amount of animal carbon. On concentration and dilution with a small amount of cyclohexane, 3,6,20-trioxo-11β,17α,21-trihydroxy-A-nor-B-homo-Δ¹-pregnene crystallizes out. Yield: 305 mg. of the pure compound melting at 226 to 228° C. with decomposition and in addition 105 mg. of a slightly less pure form melting at 222 to 228° C. with decomposition.

The starting material is obtained in the following manner:

A 750 ml.-flask is charged under nitrogen with 10.4 g. of oxalic acid dimethyl ester and 120 ml. of methylenechloride; the batch is cooled to 0° C. and 2.5 g. of freshly prepared sodium methylate dried for 1½ hours in a high vacuum at 100° C. are added. After stirring for 15 minutes, a solution of 17.38 g. of 3-oxo-4,5-oxido-11β-hydroxy-17α,20; 20,21-bismethylenedioxy-pregnane in 120 ml. of methylenechloride is added dropwise, and the whole is stirred for 5 hours at 0° C. and then for 15 hours at 20° C. The solution is neutralized with 2.48 ml. of glacial acetic acid and 720 ml. of ether are added. The whole is washed with ice-cold, dilute phosphoric acid and water, and the washing water is extracted twice with a 1:3-mixture of methylenechloride and ether. The combined organic solutions are exhaustively extracted with a solution of 1 part of concentrated ammonia in 9 parts of ice water, the extracts are acidified by addition of semi-concentrated phosphoric acid and ice and agitated with 1:3-mixture of methylenechloride and ether. The resulting extract is washed with water, dried and evaporated in a rotary evaporator at 30 to 40° C. under vacuum, to yield 17.53 g. of the 2-methyloxalyl-3-oxo-4,5-oxido - 11β-hydroxy-17α,20; 20,21-bismethylenedioxy-pregnane. This ester is dissolved in a 1.5 litre flask in 300 ml. of methylenechloride and 250 ml. of methanol; the solution is cooled to −10° to −15° C. and mixed with 50 g. of anhydrous potassium acetate. In the course of 30 minutes at −10° C. a solution of 1.77 ml. of bromine in 100 ml. of methylenechloride is vigorously stirred in, the batch is stirred for another 4½ hours at −10 to −5° C., mixed with 600 ml. of water and the suspension is exhaustively agitated with methylenechloride. The organic extracts are washed 3 times with water, dried and evaporated in a rotary evaporator at 40° C. under vacuum. The residue is mixed with 8 g. of dry lithium carbonate and a solution of 8 g. of dry lithium bromide in 200 ml. of dimethylformamide and stirred for 15 hours at 120° C. under nitrogen. The reaction mixture is then concentrated under vacuum, diluted with ethyl acetate and washed with water. On evaporation under vacuum the dried solutions yield 12.25 g. of a brown residue which is dissolved in methylenechloride, filtered through a column of 70 g. of alumina (activity II) and the residue of the eluates is recrystallized from a mixture of ether and isopropyl ether. A solution of 3 g. of the resulting 3-oxo-4,5-oxido-11β-hydroxy-17α,20; 20,21-bismethylenedioxy-Δ¹-pregnene in 110 ml. of dioxane is mixed with 3 g. of solid lithium carbonate and while being thoroughly stirred irradiated for 20 hours with a low-pressure ultraviolet lamp. The batch is filtered, the filtrate concentrated under vacuum, the residue dissolved in a 1:3-mixture of methylenechloride and ether and extracted 6 times with ice-cold 2 N-sodium hydroxide solution. The resulting alkaline suspensions are acidified with ice-cold semi-concentrated phosphoric acid and immediately extracted with a 1:3-mixture of methylenechloride and ether. The organic extracts are washed with water, dried and evaporated. When the residue is recrystallized from methylenechloride+methanol, it yields 850 mg. of 3,6-dioxo-11β-hydroxy-17α,20; 20,21-bis-methylenedioxy-A-nor-B-homo-Δ¹-pregnene melting at 231 to 239° C. with decomposition.

EXAMPLE 6

In a closable polyethylene bottle of 25 ml. capacity a mixture is prepared from 2.5 ml. of dimethyl sulfoxide and 10 ml. of the urea-hydrogen fluoride reagent described in Example 1, and then cooled to room temperature. There are then added 590 mg. of 3,6-dioxo-11β-hydroxy - 17α,20; 20,21 - bismethylenedioxy-A-nor-B-homo-Δ¹-pregnene, and the suspension is stirred for 75 minutes at 20 to 25° C. with the aid of a magnetic stirrer wrapped in Teflon, whereupon the crystals gradually dissolve. The clear solution is cautiously stirred into an ice-cold solution of 55 g. sodium acetate in 200 ml. of water. The suspension obtained in this manner is repeatedly extracted with a 1:3-mixture of methylenechloride and ether. The combined organic extracts are washed with water, dilute sodium bicarbonate-solution and with water, dried and evaporated under vacuum. The residue (450 mg.) is recrystallized from a little ethylacetate and cyclohexane to yield 385 mg. of pure 3,6,20-trioxo-11β,17α,21-trihydroxy-A-nor-B-homo-Δ¹-pregnene melting at 226 to 228° C. with decomposition.

What is claimed is:

1. Process for the manufacture of 17α,21-dihydroxy-20-ketosteroids, wherein a steroid containing the 17α,20; 20,21-bismethylenedioxy grouping is treated with a solution obtained by mixing anhydrous hydrogen fluoride with a carbamic acid amide selected from the group consisting of urea, and said urea mono-, di- or tri-lower alkyl substituted at the nitrogen atom.

2. Process as claimed in claim 1, wherein a solution obtained by mixing anhydrous hydrogen fluoride with urea is used.

3. Process as claimed in claim 1, wherein a hydrogen fluoride solution is used in which the ratio between the amounts of carbamic acid amide and hydrogen fluoride is within the range from 0.65 to 1.7.

4. Process as claimed in claim 1, wherein the reaction of the steroid with the hydrogen fluoride solution is performed in the presence of dimethylsulfoxide.

5. Process as claimed in claim 1, wherein the reaction of the steroid with the hydrogen fluoride solution is carried out within the temperature range from 0° C. to 30° C.

References Cited

UNITED STATES PATENTS 3,338,930 8/1967 Alvarez et al. _____ 260—397.45
3,211,758 10/1965 Tarkoey _____ 260—397.2

LEWIS GOTTS, *Primary Examiner.*

ETHEL G. LOVE, *Assistant Examiner.*

U.S. Cl. X.R.

204—158; 260—239.55, 397.47, 586